United States Patent
Ochi

(10) Patent No.: US 10,760,515 B2
(45) Date of Patent: Sep. 1, 2020

(54) CONTROLLER FOR INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota-shi, Aichi-ken (JP)

(72) Inventor: Yuta Ochi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 16/192,345

(22) Filed: Nov. 15, 2018

(65) Prior Publication Data
US 2019/0162128 A1   May 30, 2019

(30) Foreign Application Priority Data
Nov. 27, 2017   (JP) ................. 2017-226931

(51) Int. Cl.
| F02D 41/02 | (2006.01) |
| F02D 41/20 | (2006.01) |
| F02D 41/38 | (2006.01) |
| F02D 41/40 | (2006.01) |

(52) U.S. Cl.
CPC .......... *F02D 41/20* (2013.01); *F02D 41/38* (2013.01); *F02D 41/402* (2013.01); *F02D 41/0255* (2013.01); *F02D 41/3845* (2013.01); *F02D 2041/2003* (2013.01); *F02D 2041/2044* (2013.01); *F02D 2041/389* (2013.01); *F02D 2200/0602* (2013.01)

(58) Field of Classification Search
CPC ...... F02D 41/0255; F02D 41/20; F02D 41/38; F02D 41/3845; F02D 41/402; F02D 2041/2003; F02D 2041/2044; F02D 2041/389; F02D 2200/0602
See application file for complete search history.

(56) References Cited

U.S. PATENT DOCUMENTS

2008/0281500 A1   11/2008   Nakata et al.
2018/0017005 A1*   1/2018   Kusakabe ............... F02D 41/20

FOREIGN PATENT DOCUMENTS

| JP | 2008-280851 A | 11/2008 |
| JP | 2010-116852 A | 5/2010 |
| JP | 2013-124577 A | 6/2013 |
| JP | 2016-223348 A | 12/2016 |

* cited by examiner

*Primary Examiner* — Audrey K Bradley
(74) *Attorney, Agent, or Firm* — Oliff PLC

(57) ABSTRACT

A controller of an internal combustion engine includes processing circuitry configured to execute a peak current command value calculating process of calculating a peak current command value, which is a command value of a peak current flowing through a coil, based on a detection value of a pressure in a delivery pipe, and a peak control process of controlling a value of the peak current at the peak current command value. The in-cylinder injection valve is configured to execute multi-stage injection including a first injection and a second injection carried out at a timing toward a retarding side from the first injection. A peak current command value for the second injection is larger than the peak current command value for the first injection.

6 Claims, 7 Drawing Sheets

CONTROLLER FOR INTERNAL COMBUSTION ENGINE AND METHOD FOR CONTROLLING INTERNAL COMBUSTION ENGINE

BACKGROUND ART

The present invention relates to a controller for an internal combustion engine and a method for controlling an internal combustion engine.

Japanese Laid-Open Patent Publication No. 2016-223348 describes a controller that sets a peak value of a current energizing a coil of an in-cylinder injection valve based on a pressure in a high pressure accumulating piping (delivery pipe) (see paragraphs [0026], [0037]).

SUMMARY

When the in-cylinder injection valve is shifted from a valve-opened state to a valve-closed state and the fuel injection is terminated, pulsation occurs in the pressure of the fuel in the in-cylinder injection valve due to the closing of the valve. Although the pulsation attenuates as time elapses, the pulsation is outstanding for a while after the in-cylinder injection valve shifts from the valve-opened state to the valve-closed state. When the in-cylinder injection valve injects fuel a number of times during a single combustion cycle, the second fuel injection may be carried out immediately after the first fuel injection is terminated. The pressure in the delivery pipe is referred to when setting the peak value for the second fuel injection. The pressure in the delivery pipe may greatly shift from the pressure in the in-cylinder injection valve. Such shift is caused by the pulsation in the pressure that occurs in the in-cylinder injection valve after the first fuel injection is terminated. In particular, the pressure in the in-cylinder injection valve may become higher than the pressure in the delivery pipe referred to when determining the peak value for the second fuel injection depending on the phase of the pulsation. Thus, the peak value may become smaller than the value necessary when opening the in-cylinder injection valve. Further, the in-cylinder injection valve may not be able to inject fuel.

Aspects of the present invention and advantages of the aspects will now be described.

Aspect 1. A controller for an internal combustion engine. The internal combustion engine includes an in-cylinder injection valve configured to inject fuel supplied from a delivery pipe to a combustion chamber when opened by an electromagnetic force that acts on a movable element including a magnetic body and is generated by an energizing process of energizing a coil. The in-cylinder injection valve is further configured to execute multi-stage injection. The multi-stage injection includes execution of a plurality of fuel injections during a single combustion cycle in a cylinder, the plurality of fuel injections includes at least a first injection and a second injection carried out at a timing toward a retarding side from the first injection, and the timing at which the second injection is carried out is adjacent in time to a timing at which the first injection is carried out. The controller includes processing circuitry configured to execute a peak current command value calculating process of calculating a peak current command value, which is a command value of a peak current flowing through the coil because of the energizing process, based on a detection value of a pressure in the delivery pipe, and a peak control process of controlling a value of the peak current flowing to the coil at the peak current command value. The peak current command value calculating process includes, when the multi-stage injection is executed, a process of calculating a peak current command value for the first injection and a peak current command value for the second injection, the peak current command value for the second injection being greater than the peak current command value for the first injection.

The pulsation of the pressure may occur in the fuel of the in-cylinder injection valve by executing the first injection. In the configuration described above, a peak current command value for the second injection is calculated to a value larger than the peak current command value for the first injection. Thus, even when the value of the pressure of the fuel in the in-cylinder injection valve at the time of the execution of the second injection becomes higher than a detection value input in the peak current command value calculating process due to the pulsation of the pressure, the in-cylinder injection valve is able to inject fuel.

Aspect 2. With the controller according to aspect 1, the peak current command value calculating process includes a process of calculating the peak current command value for the second injection to be a larger value when a time interval between the first injection and the second injection is short than when the time interval is long.

The amplitude of the pulsation of the pressure occurring in the in-cylinder injection valve after the termination of the first injection tends to attenuate as time elapses. Thus, the amplitude of the pulsation of the pressure tends to be larger and the pressure in the in-cylinder injection valve tends to be larger as the time interval is shorter. Therefore, in the configuration described above, the peak current command value for the second injection is calculated to be a larger value as the time interval becomes shorter.

Aspect 3. With the controller according to aspect 2, the peak current command value calculating process includes a base process of calculating a base peak current command value based on a detection value of the pressure, a correction amount calculating process of calculating an increase correction amount to be a larger value when a time interval between the first injection and the second injection is short than when the time interval is long, a process of setting a value in which the base peak current command value is increase-corrected using the increase correction amount as the peak current command value for the second injection, and a process of setting the base peak current command value as the peak current command value for the first injection. The base peak current command value for the first injection and the base peak current command value for the second injection are calculated based on the same detection value of the pressure.

The time interval of the first injection and the second injection may be short, and the detection value of the pressure in a period between the first injection and the second injection may be difficult to acquire. In the configuration described above, the base peak current command value for the first injection and the base peak current command value for the second injection are calculated based on the same detection value of the pressure. Thus, even if it is difficult to acquire the detection value of the pressure in the period between the first injection and the second injection, the peak current command value for the second injection can be appropriately set.

Aspect 4. With the controller according to any one of aspects 1 to 3, the in-cylinder injection valve is arranged in a region sandwiched by an intake valve and an exhaust valve.

When the in-cylinder injection valve is arranged between the intake valve and the exhaust valve, the distance between the injection hole of the in-cylinder injection valve and the delivery pipe tends to become long compared to, for example, when the in-cylinder injection valve is arranged close to the intake valve and away from between the intake valve and the exhaust valve. When the distance between the injection hole and the delivery pipe is long, the difference between the pressure in the delivery pipe and the pressure near the injection hole of the in-cylinder injection valve tends to become large. Thus, there is a particularly large merit in setting the peak current command value for the second injection to a large value.

Aspect 5. With the controller according to any one of aspects 1 to 4, a catalyst is arranged in an exhaust passage of the internal combustion engine. The peak current command value calculating process is executed when multi-stage injection is carried out from the in-cylinder injection valve in a rapid warming process of the catalyst after the internal combustion engine is started.

In the configuration described above, the peak current command value of the second injection is increased in the multi-stage injection during the rapid warming process. In the multi-stage injection during the rapid warming process, the time interval between the start timing of the first injection and the start timing of the second injection tends to become short compared to the multi-stage injection during a high load operation. Thus, the influence of the pulsation of the pressure in the in-cylinder injection valve caused by the first injection tends to become particularly significant for the second injection. Thus, there is a particularly large merit in setting the peak current command value for the second injection to a large value.

Aspect 6. A method for controlling an internal combustion engine. The internal combustion engine includes an in-cylinder injection valve configured to inject fuel supplied from a delivery pipe to a combustion chamber when opened by an electromagnetic force that acts on a movable element including a magnetic body and is generated by an energizing process of energizing a coil. The in-cylinder injection valve is further configured to execute multi-stage injection. The multi-stage injection includes execution of a plurality of fuel injections during a single combustion cycle in a cylinder. The plurality of fuel injections includes at least a first injection and a second injection carried out at a timing toward a retarding side from the first injection. The timing at which the second injection is carried out is adjacent in time to a timing at which the first injection is carried out. The method includes executing a peak current command value calculating process of calculating a peak current command value, which is a command value of a peak current flowing through the coil because of the energizing process, based on a detection value of a pressure in the delivery pipe, and executing a peak control process of controlling a value of the peak current flowing to the coil at the peak current command value. The peak current command value calculating process includes, when the multi-stage injection is executed, a process of calculating a peak current command value for the first injection and a peak current command value for the second injection, the peak current command value for the second injection being greater than the peak current command value for the first injection.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

One embodiment of a controller of an internal combustion engine will now be described with reference to the drawings.

Figure 1:
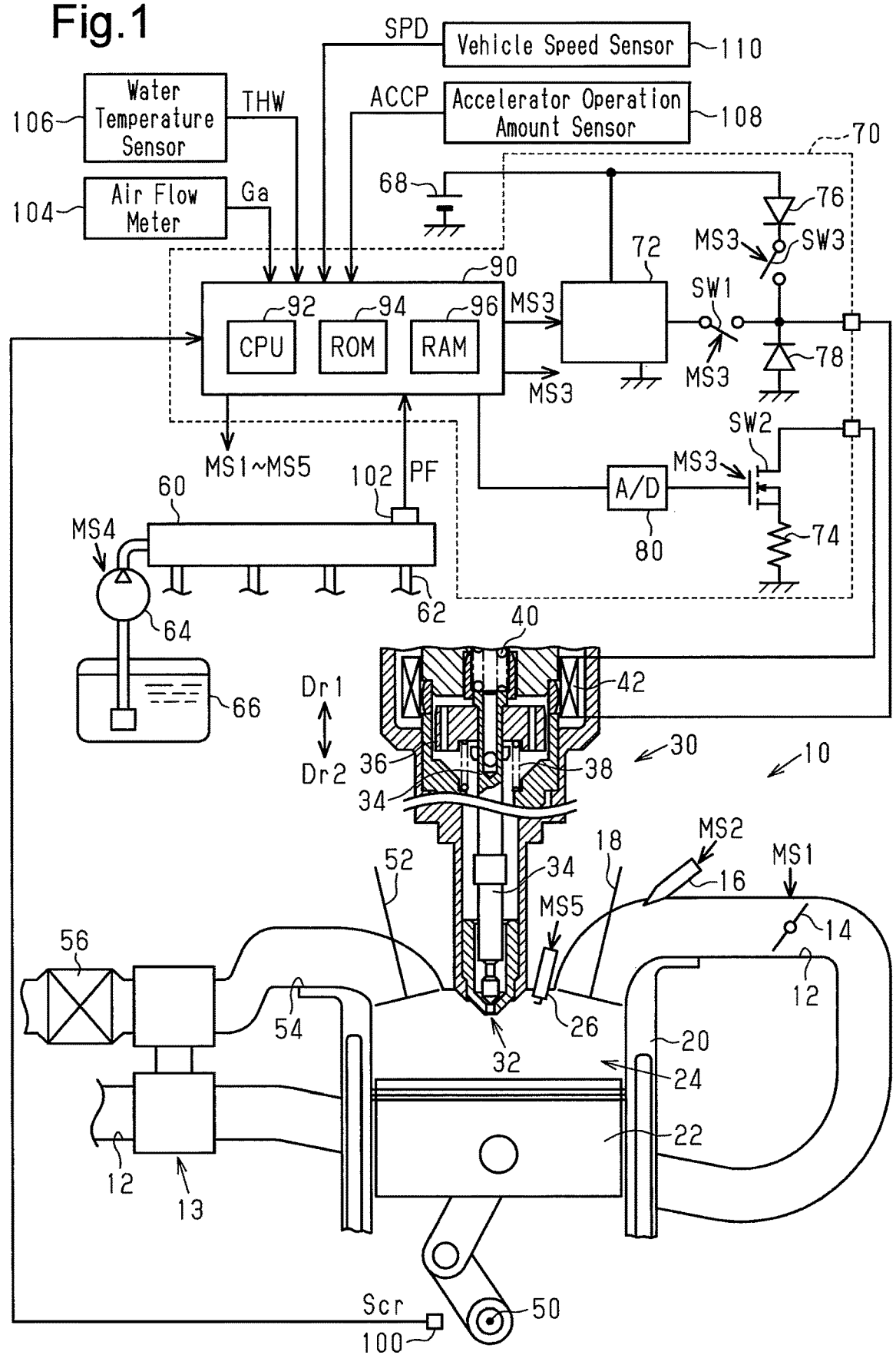
FIG. 1 is a diagram showing an internal combustion engine and a controller of the internal combustion engine according to one embodiment.

As shown in FIG. 1, a throttle valve 14 is arranged in a region on a downstream side of a supercharger 13 in an intake passage 12 of an internal combustion engine 10, and a port injection valve 16 is arranged in a region on a downstream side of the throttle valve 14 in the intake passage 12. Air taken into the intake passage 12 and fuel injected from the port injection valve 16 flow into a combustion chamber 24 defined by a cylinder 20 and a piston 22 accompanying the opening of an intake valve 18. An ignition device 26 and an in-cylinder injection valve 30 are arranged in the combustion chamber 24. The mixed air of the fuel and the air is combusted by spark discharge caused by the ignition device 26 in the combustion chamber 24, and the energy generated by the combustion is converted to rotation energy of a crankshaft 50 through the piston 22. The mixed air subjected to combustion is discharged to an exhaust passage 54 as exhaust air accompanying the opening of an exhaust valve 52. A three-way catalyst 56 is arranged in a region on the downstream side of the supercharger 13 in an exhaust passage 54.

The in-cylinder injection valve 30 according to the present embodiment is arranged between the intake valve 18 and the exhaust valve 52 (center injection method). An injection hole 32 is formed at a distal end portion of the in-cylinder injection valve 30, and the injection hole 32 is exposed to the combustion chamber 24. The injection hole 32 is opened/closed by a nozzle needle 34. A movable element 36 including a magnetic body is brought into contact with the nozzle needle 34, and the movable element 36 is subjected to an elastic force in a valve opening direction of the nozzle needle 34 by a spring 38. The elastic force of the spring 38 is also applied to the nozzle needle 34 through the movable element 36. The nozzle needle 34 is also subjected to an elastic force in a valve closing direction by a spring 40. Furthermore, the in-cylinder injection valve 30 includes a solenoid coil 42, and the movable element 36 is affected by electromagnetic force in the valve opening direction of the nozzle needle 34 when the solenoid coil 42 is energized.

As the elastic force of the spring 40 is greater than the elastic force of the spring 38, the nozzle needle 34 is in the valve-closed state when the electromagnetic force is not acting on the movable element 36. On the other hand, when the electromagnetic force of the solenoid coil 42 is acting on the movable element 36, and the resultant force of the electromagnetic force acting on the movable element 36 and the elastic force applied on the movable element 36 by the spring 38 is greater than the resultant force of the elastic force of the spring 40 and the force in the valve closing direction applied on the nozzle needle 34 by the fuel, the nozzle needle 34 is opened.

The fuel is supplied from a delivery pipe 60 to the in-cylinder injection valve 30 through a piping 62 of which flow path cross-sectional area is smaller than a flow path cross-sectional area of the delivery pipe 60. The fuel pumped out from a fuel tank 66 by a fuel pump 64 is supplied to the delivery pipe 60. In the present embodiment, the fuel pump 64 includes a discharge amount adjusting valve that adjusts the amount of fuel to discharge to the delivery pipe 60 of the fuel taken in.

A controller 70 controls the internal combustion engine 10, and outputs operation signals MS1 to MS5 to operate operation units of the internal combustion engine 10 such as the throttle valve 14, the port injection valve 16, the ignition device 26, and the in-cylinder injection valve 30 to control the control amount (torque, exhaust component, etc.) of the internal combustion engine 10. In the present embodiment, the controller 70 includes a drive circuit that drives the solenoid coil 42 of the in-cylinder injection valve 30. Specifically describing the configuration of the drive circuit, a booster circuit 72 boosts the voltage of a battery 68. An output terminal of the booster circuit 72 is connected to one terminal of the solenoid coil 42 by way of a switching element SW1. The other terminal of the solenoid coil 42 is grounded through a series connected body of a switching element SW2 and a shunt resistor 74 of the controller 70. Furthermore, a voltage of the battery 68 is applied to a region between the switching element SW1 and the solenoid coil 42 through a diode 76 and a switching element SW3 connected to a cathode side of the diode 76. A diode 78 is connected to a region between the switching element SW1 and the solenoid coil 42, and an anode of the diode 78 is grounded. The voltage drop of the shunt resistor 74 is converted to digital data by an A/D converter 80, and then taken into a microcomputer 90. The microcomputer 90 refers to an output signal Scr of a crank angle sensor 100, a pressure of the fuel (fuel pressure PF) in the delivery pipe 60 detected by a fuel pressure sensor 102, an intake air amount Ga detected by an air flowmeter 104, and a temperature of a cooling water (water temperature THW) of the internal combustion engine 10 detected by a water temperature sensor 106 to execute the control of the control amount. Furthermore, the microcomputer 90 refers to a depression amount (accelerator operation amount ACCP) of an accelerator pedal detected by an accelerator operation amount sensor 108, and a vehicle speed SPD detected by a vehicle speed sensor 110. The microcomputer 90 includes a CPU 92, a ROM 94, and a RAM 96, and executes the control of the control amount by having the CPU 92 execute programs stored in the ROM 94.

Figure 2:
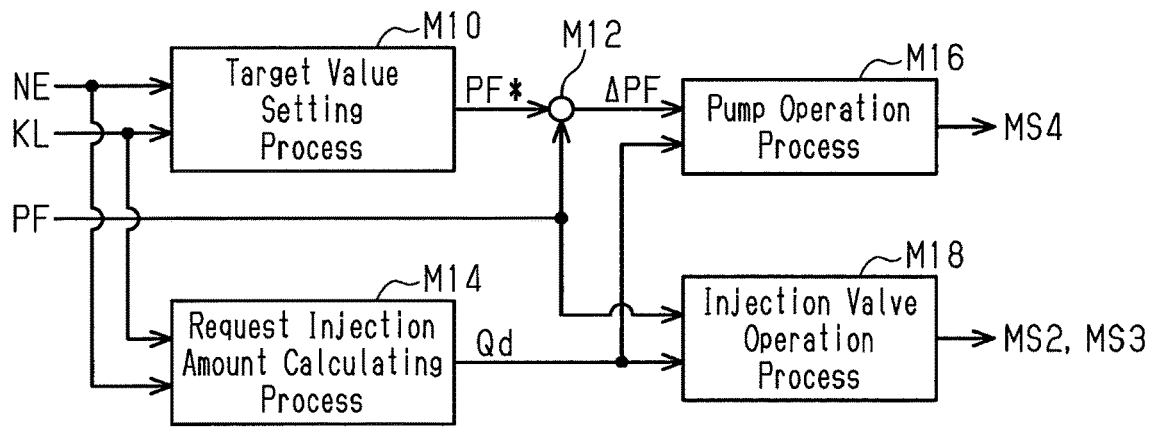
FIG. 2 is a block diagram showing part of a process executed by the controller of FIG. 1.

FIG. 2 shows one part of a process executed by the controller 70. The processes shown in FIG. 2 are realized by the CPU 92 executing the program stored in the ROM 94.

A target value setting process M10 sets a target value PF* of the fuel pressure PF based on a rotation speed NE calculated based on the output signal Scr of the crank angle sensor 100 and a load rate KL. The set target value PF* becomes higher when a filling air amount in the combustion chamber 24 is large than when the filling air amount is small. The load rate KL is a parameter for quantifying a cylinder filling air amount, and is calculated based on the intake air amount Ga by the CPU 92. The load rate KL is a ratio of a flow-in air amount per combustion cycle of a cylinder with respect to a reference flow-in air amount. The reference flow-in air amount may be an amount variably set according to the rotation speed NE.

A deviation calculating process M12 calculates a difference (deviation ΔPF) between the target value PF* and the fuel pressure PF.

A request injection amount calculating process M14 calculates a request injection amount Qd based on the rotation speed NE and the load rate KL. The request injection amount Qd is set so that the air-fuel ratio of the mixed air to be subjected to combustion in the combustion chamber 24 becomes the target air-fuel ratio. The target air-fuel ratio may be, for example, a theoretical air-fuel ratio.

A pump operation process M16 generates an operation signal MS4 of the fuel pump 64 based on the deviation ΔPF and the request injection amount Qd, and outputs the generated signal. The request injection amount Qd is used to calculate an operation amount (open loop operation amount) of an open loop control for having the fuel of amount equal to the request injection amount Qd pressure-fed from the fuel pump 64 to the delivery pipe 60. The deviation ΔPF is used to calculate an operation amount (feedback operation amount) for adjusting the fuel pressure PF to the target value PF* through the feedback control. In other words, the operation signal MS4 is generated based on both the open loop operation amount and the feedback operation amount.

An injection valve operation process M18 generates operation signals MS2, MS3 for operating the port injection valve 16 and the in-cylinder injection valve 30 based on the request injection amount Qd and the fuel pressure PF, and outputs the generated signals.

Figure 3:
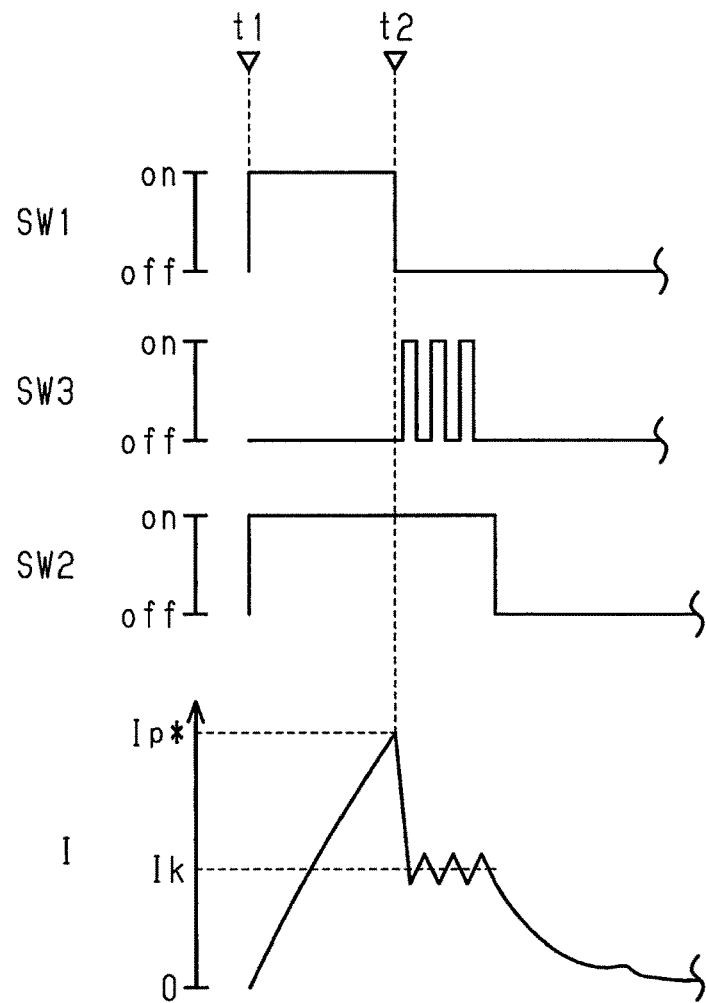
FIG. 3 is a timing chart showing a process related to fuel injection of an in-cylinder injection valve executed by the controller of FIG. 1.

FIG. 3 illustrates the operation of the in-cylinder injection valve 30 by the injection valve operation process M18. Specifically, FIG. 3 shows the transition of the respective operation states of the switching elements SW1 to SW3 and the transition of the current I flowing through the solenoid coil 42. Here, the CPU 92 detects the current I by the voltage drop of the shunt resistor 74.

As shown in FIG. 3, at time t1, the CPU 92 turns ON both the switching element SW1 and the switching element SW2, so that a boosted voltage of the booster circuit 72 is applied to the solenoid coil 42 shown in FIG. 1. Thus, after time t1, the current flowing through the solenoid coil 42 is increased. In response to the current flowing through the solenoid coil 42 reaching a command value of the peak current (peak current command value Ip*) at time t2, the CPU 92 turns OFF the switching element SW1. When the switching element SW1 is turned OFF, the boosted voltage of the booster circuit 72 is not applied to the solenoid coil 42. Thus, the current flowing through the solenoid coil 42 is reduced. After the switching element SW1 is turned OFF, the current that has flowed into the solenoid coil 42 from the diode 78 shown in FIG. 1 flows through the switching element SW2 and the shunt resistor 74. When the value of the current flowing through the solenoid coil 42 becomes smaller than the value of the holding current Ik, the switching element SW3 is turned to the ON state by the CPU 92. The voltage of the battery 68 is thereby applied to the solenoid coil 42, and hence the current flowing through the solenoid coil 42 is increased. When the current flowing through the solenoid coil 42 is increased, the switching element SW3 is turned to the OFF state by the CPU 92. When the switching element SW3 is turned to the OFF state, the current flowing to the solenoid coil 42 is reduced. Thus, the value of the current flowing to the solenoid coil 42 is feedback-controlled to the value of the holding current Ik by the ON/OFF operation of the switching element SW3 by the CPU 92. When the injection period is terminated, the switching element SW2 is turned to the OFF state by the CPU 92.

The injection valve operation process M18 variably sets the fuel injection using the in-cylinder injection valve 30 and the fuel injection using the port injection valve 16 according to the operation point of the internal combustion engine 10 determined by the rotation speed NE and the load rate KL.

Figure 4:
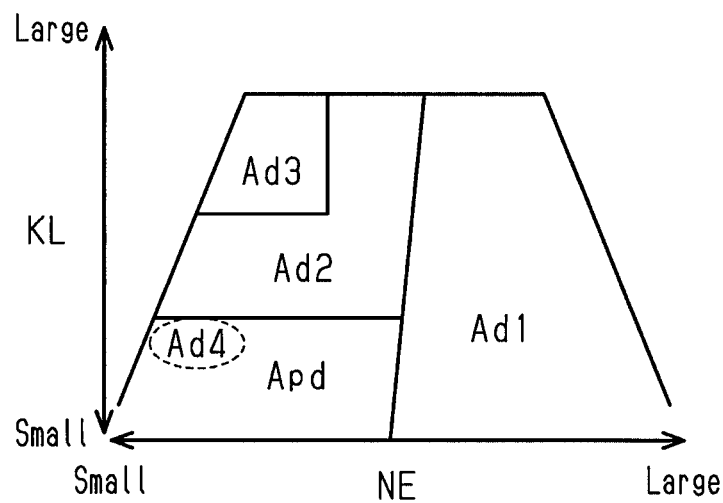
FIG. 4 is a diagram showing map data defining a pattern of the injection executed in the internal combustion engine of FIG. 1.

FIG. 4 shows a plurality of regions respectively defining an injection pattern. A region Ad1 of high rotation is a region of injecting the fuel of the request injection amount Qd by one fuel injection from the in-cylinder injection valve 30 in a single combustion cycle in a cylinder. A region Ad2 in which the rotation speed NE is relatively low and the load is relatively high is a region of injecting the fuel of the request injection amount Qd by two fuel injections from the in-cylinder injection valve 30 in a single combustion cycle in a cylinder. A region Ad3 in which the rotation speed NE is low and the load is higher than the region Ad2 is a region of injecting the fuel of the request injection amount Qd by three fuel injections from the in-cylinder injection valve 30 in a single combustion cycle in a cylinder. A region Apd in which the rotation speed NE is low and the load rate KL is smaller than the region Ad2 is a region of injecting the fuel of the request injection amount Qd by the fuel injections using the port injection valve 16 and the in-cylinder injection valve 30 in a single combustion cycle in a cylinder. A region Ad4 of relatively low rotation in the region Apd is a region of executing a rapid warming process of the three-way catalyst 56 only at the time of an idling control of after a cold start of the internal combustion engine 10. The idling control (first idle) at the time of the rapid warming process sets the rotation speed NE to a large value compared to the rotation speed NE at the time of the idling control in the normal time. In order for the executing condition of the idling control at the time of the rapid warming process to be true, the condition that the water temperature THW is lower than or equal to the specified temperature, the condition that the accelerator pedal is released, and the condition that a vehicle speed SPD is zero all need to be true.

Figure 5:
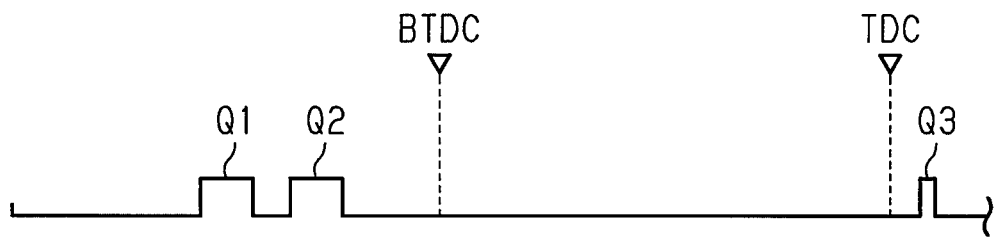
FIG. 5 is a timing chart showing a rapid warming process for warming a catalyst executed by the controller of FIG. 1.

FIG. 5 shows a fuel injection pattern at the time of the rapid warming process. As shown in FIG. 5, at the time of the rapid warming process, three fuel injections are executed using the in-cylinder injection valve 30. Specifically, after a first fuel injection Q1 and a second fuel injection Q2 are executed in an intake stroke, a third fuel injection Q3 is executed at a timing toward a retarding side from a timing at which a piston reaches a compression top dead point.

Figure 6:
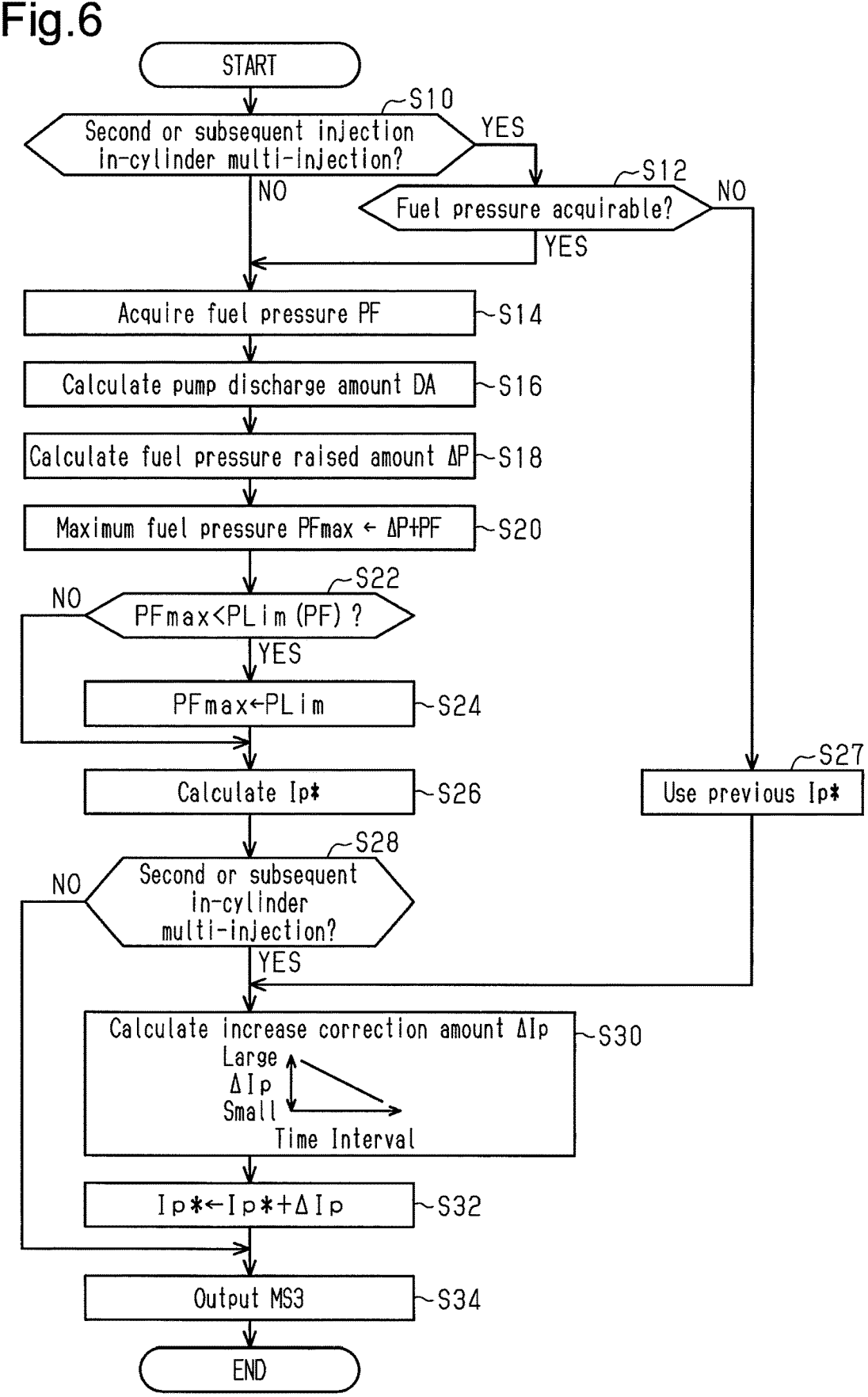
FIG. 6 is a flowchart showing a procedure of an injection valve operation process executed by the controller of FIG. 1.

FIG. 6 shows a procedure of an operation process of the in-cylinder injection valve 30, in particular, of the injection valve operation process M18. The in-cylinder injection valve 30 can execute a cylinder multi-injection of executing a plurality of fuel injections in a single combustion cycle in a cylinder. The cylinder multi-injection includes at least an advancing side injection, which is a first injection, and a retarding side injection, which is a second injection, carried out at a timing toward the retarding side from the first injection. The process shown in FIG. 6 is realized by having the CPU 92 execute the program stored in the ROM 94 at, for example, a crank angle advanced from a crank angle corresponding to a fuel injection start time by a predetermined crank angle (e.g., 30° CA). Specifically, the process is repeated by having the CPU 92 execute the program every time the crank angle becomes the advanced crank angle. The fuel injection start time is set by the CPU 92 based on the rotation speed NE, the load rate KL, and the water temperature THW. Hereinafter, the step numbers are represented by numbers with "S" at the beginning.

In the series of processes shown in FIG. 6, the CPU 92 first determines whether or not the current fuel injection is the second or subsequent fuel injection in the cylinder multi-injection (S10). When determining that the current fuel injection is the second or subsequent fuel injection in the cylinder multi-injection (S10: YES), the CPU 92 determines whether or not the fuel pressure PF can be acquired for the current fuel injection (S12). The determination of S12 is executed assuming the time interval from the start of the previous fuel injection to the start of the current fuel injection is short in the cylinder multi-injection, and the fuel pressure PF is sometimes difficult to acquire for the current fuel injection. For example, the first fuel injection Q1 and the second fuel injection Q2 at the time of the rapid warming process shown in FIG. 5 have a small injection amount, and the rotation speed NE at the time is greater than at the time of the idling control in the normal time. Therefore, since the time interval from the start of the first fuel injection Q1 to the start of the second fuel injection Q2 is particularly short, the fuel pressure PF cannot be newly acquired for the second fuel injection. For example, when the rotation speed of the first idle is "1600 rpm" and an angle interval from a crank angle at which the first fuel injection Q1 is started to a crank angle at which the second fuel injection Q2 is started is about "20° CA," the time interval from the start of the fuel injection of the first fuel injection Q1 to the start of the second fuel injection Q2 becomes about "3 ms." Thus, when a sampling cycle of the fuel pressure PF is greater than or equal to "3/2 ms," the fuel pressure PF may not be newly acquired for the second fuel injection. On the contrary, since the time interval from the start of the second fuel injection Q2 to the start of the third fuel injection Q3 shown in FIG. 5 is long, the fuel pressure PF can be newly acquired for the third fuel injection.

When determining that the fuel pressure PF can be acquired (S12: YES) or a negative determination is made in S10, the CPU 92 acquires the fuel pressure PF (S14). The CPU 92 then calculates a pump discharge amount DA (S16). Specifically, the CPU 92 obtains a valve closing timing of the discharge amount adjusting valve based on the operation signal MS4, and calculates the pump discharge amount DA to be a larger value as the valve closing timing is further toward the advancing side. The CPU 92 then calculates a fuel pressure raised amount ΔP to be a larger value when the pump discharge amount DA is large than when the pump discharge amount DA is small based on the pump discharge amount DA (S18).

The CPU 92 then substitutes the sum of the fuel pressure raised amount ΔP and the fuel pressure PF acquired in the process of S14 to the maximum fuel pressure PFmax, which is the maximum value assumed as the fuel pressure PF when injecting the fuel from the in-cylinder injection valve 30 (S20). The CPU 92 then determines whether or not the maximum fuel pressure PFmax is smaller than a lower limit guard value PLim (S22). The CPU 92 calculates the lower limit guard value PLim to be a larger value when the fuel pressure PF is large than when the fuel pressure PF is small. Specifically, map data in which the fuel pressure PF is an input variable and the lower limit guard value PLim is an output variable is stored in the ROM 94, and the CPU 92 obtains the lower limit guard value PLim through map calculation. The map data is set data of a discrete value of the input variable and a value of the output variable corresponding to each value of the input variable. The map calculation may be, for example, a process of outputting a value of the output variable of the corresponding map data as a calculation result when the value of the input variable matches one of the values of the input variables of the map data, and outputting a value obtained by interpolation of the values of a plurality of output variables included in the map data as a calculation result when the value of the input variable does not match any of the values of the input variables of the map data.

When determining that the maximum fuel pressure PFmax is smaller than the lower limit guard value PLim (S22: YES), the CPU 92 substitutes the lower limit guard value PLim to the maximum fuel pressure PFmax (S24). When the process of S24 is completed or when a negative determination is made in the process of S22, the CPU 92 calculates a peak current command value Ip* based on the maximum fuel pressure PFmax (S26). Specifically, the CPU 92 calculates the peak current command value Ip* to be a larger value when the maximum fuel pressure PFmax is large than when the maximum fuel pressure PFmax is small. This is because the force in the valve closing direction of the nozzle needle 34 applied by the fuel on the nozzle needle 34 becomes larger when the pressure of the fuel in the in-cylinder injection valve 30 is high than when the pressure of the fuel in the in-cylinder injection valve 30 is low, and thus the electromagnetic force necessary to overcome such force becomes large. This process can be realized by storing the map data in which the maximum fuel pressure PFmax is the input variable and the peak current command value Ip* is the output variable in the ROM 94, and having the CPU 92 obtain the peak current command value Ip* through the map calculation.

When a negative determination is made in the process of S12, the CPU 92 uses the peak current command value Ip* calculated in the process of S26 in the previous injection at the peak current command value Ip* for the current fuel injection (S27). When the process of S26 is completed, the CPU 92 determines whether or not the current fuel injection is the second or subsequent injection of the cylinder multi-injection (S28). When determining that the current fuel injection is the second or subsequent injection of the cylinder multi-injection (S28: YES) or when the process of S27 is completed, the CPU 92 calculates an increase correction amount ΔIp of the peak current command value Ip* (S30). This process takes into consideration that the maximum fuel pressure PFmax calculated based on the fuel pressure PF acquired by the process of S14 may become lower than the pressure of the fuel near the nozzle needle 34, in particular, in the interior of the in-cylinder injection valve 30 at the time of the second or subsequent fuel injection. This will be described below.

Figure 7:
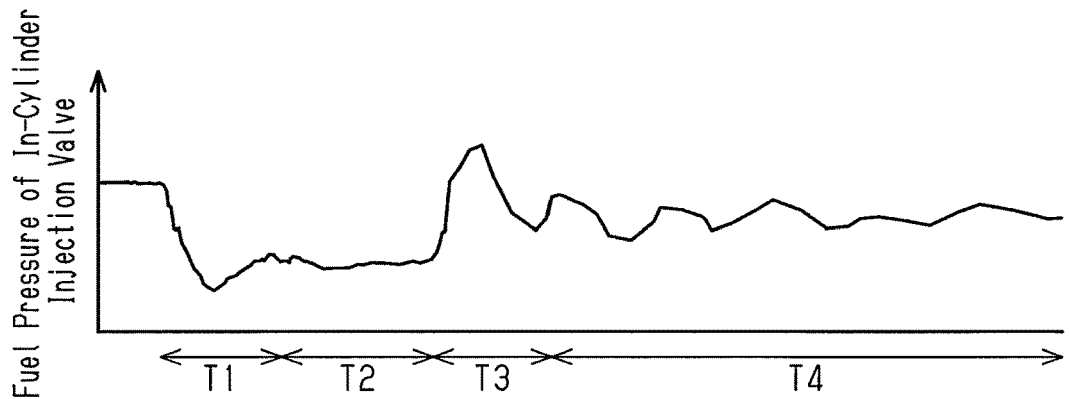
FIG. 7 is a timing chart showing pressure pulsation of the in-cylinder injection valve in the internal combustion engine of FIG. 1.

FIG. 7 shows the transition of the pressure of the fuel near the nozzle needle 34, in particular, in the in-cylinder injection valve 30 that fluctuates accompanying the injection of the fuel from the in-cylinder injection valve 30. As shown in FIG. 7, in an initial period T1 in which the fuel injection is started, the injection to the combustion chamber 24 of the fuel is started by the valve opening of the injection hole 32, and thus the pressure of the fuel near the nozzle needle 34 is lowered, and thereafter, the impact at the time of valve opening is propagated, thus raising the pressure of the fuel near the nozzle needle 34. In a subsequent recovery period T2, the fuel flows into the in-cylinder injection valve 30 from the delivery pipe 60, and thus the fluctuation in the pressure of the fuel near the nozzle needle 34 becomes small. Thereafter, in a water hammering period T3, the pressure of the fuel near the nozzle needle 34 greatly fluctuates by a water hammer phenomenon that occurs by the valve closing of the injection hole 32. In the subsequent pulsation period T4, the pulsation caused by the fluctuation in the pressure of the fuel generated in the water hammering period T3 is continued.

Thus, the second and subsequent fuel injection when the cylinder multi-injection is performed is thus carried out in the water hammering period T3 and the pulsation period T4, in which the pulsation caused by the fuel injection toward the advancing side is generated, adjacent to each other in time. At the time of the second or subsequent fuel injection, the pressure of the fuel near the nozzle needle 34 greatly fluctuates with respect to the fuel pressure PF in the delivery pipe 60. The pressure of the fuel near the nozzle needle 34 may be higher or may be lower than the fuel pressure PF. However, since the period of pulsation in the pressure of the fuel fluctuates dependently on the temperature of the fuel and the like, it is difficult to estimate the pressure of the fuel near the nozzle needle 34 in the water hammering period T3 and the pulsation period T4. Thus, in the present embodiment, the increase correction amount ΔIp is calculated so as to displace the nozzle needle 34 in the valve opening direction to execute the fuel injection even if the pressure of the fuel near the nozzle needle 34 reaches an assumed maximum value in the water hammering period T3 and the pulsation period T4.

Figure 8A:
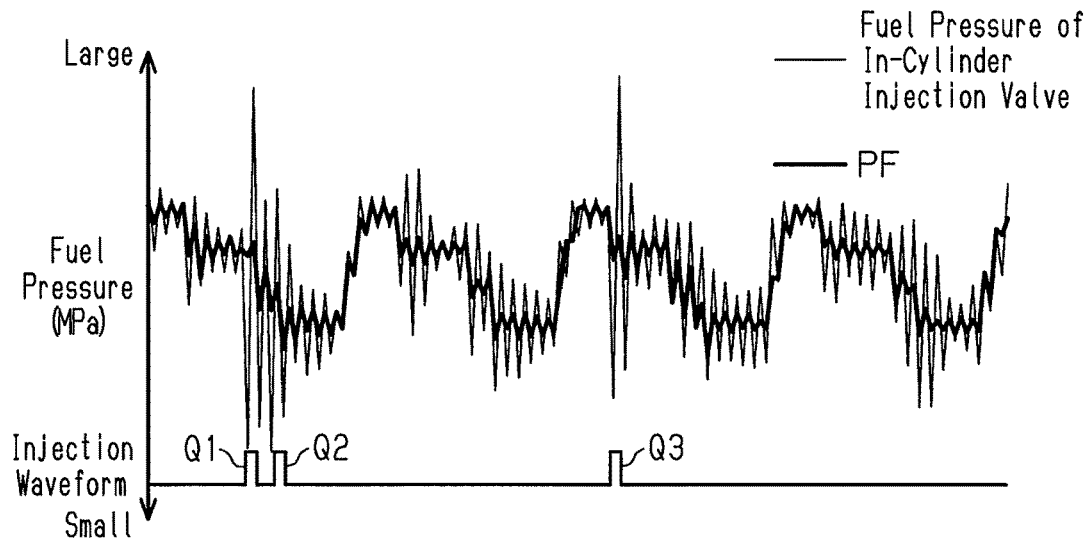
FIGS. 8A and 8B are timing charts showing the pressure pulsation of the in-cylinder injection valve in the internal combustion engine of FIG. 1.
Figure 8B:
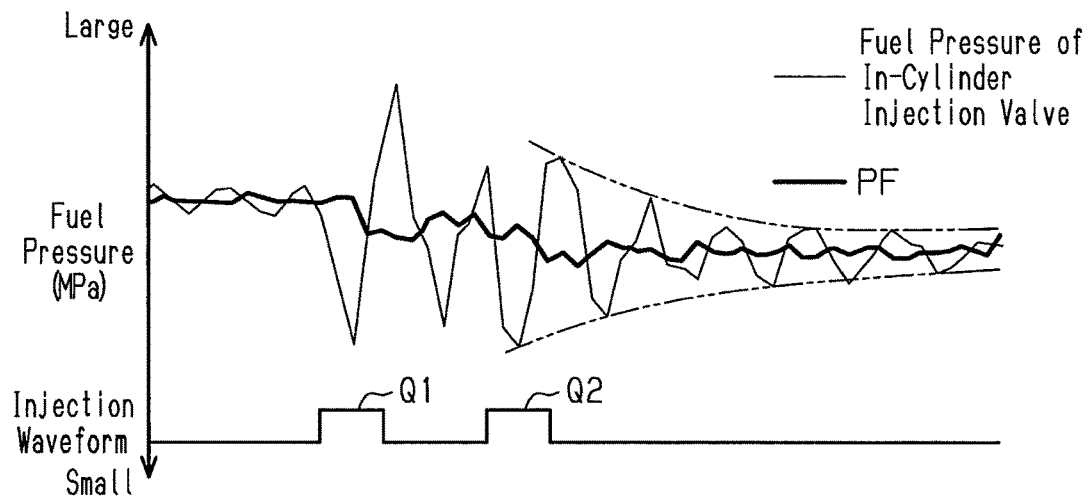

Specifically, the CPU 92 calculates the increase correction amount ΔIp for the second or subsequent fuel injections to be a larger value when a time interval between the second or subsequent fuel injection and the preceding fuel injection toward the advancing side is short than when such time interval is long. This is because the magnitude of the pulsation in the pressure of the fuel in the in-cylinder injection valve 30 attenuates as time elapses, as shown in FIGS. 8A and 8B. FIG. 8B is a partially enlarged view of FIG. 8A. Furthermore, FIGS. 8A and 8B show a transition of the pressure of the fuel in the in-cylinder injection valve 30 and the transition of the fuel pressure PF at the time of the rapid warming process of the catalyst.

Returning back to FIG. 6, the CPU 92 substitutes a value, in which the increase correction amount ΔIp is added to the peak current command value Ip* calculated in the process of S26, to the peak current command value Ip* (S32). When the process of S32 is completed or when a negative determination is made in the process of S28, the CPU 92 outputs an operation signal MS3 to carry out the fuel injection using the in-cylinder injection valve 30 while controlling the value of the peak current Ip at the peak current command value Ip* (S34).

When the process of S34 is completed, the CPU 92 once terminates the series of processes shown in FIG. 6.

The operations and effects of the present embodiment will now be described.

Figure 9:
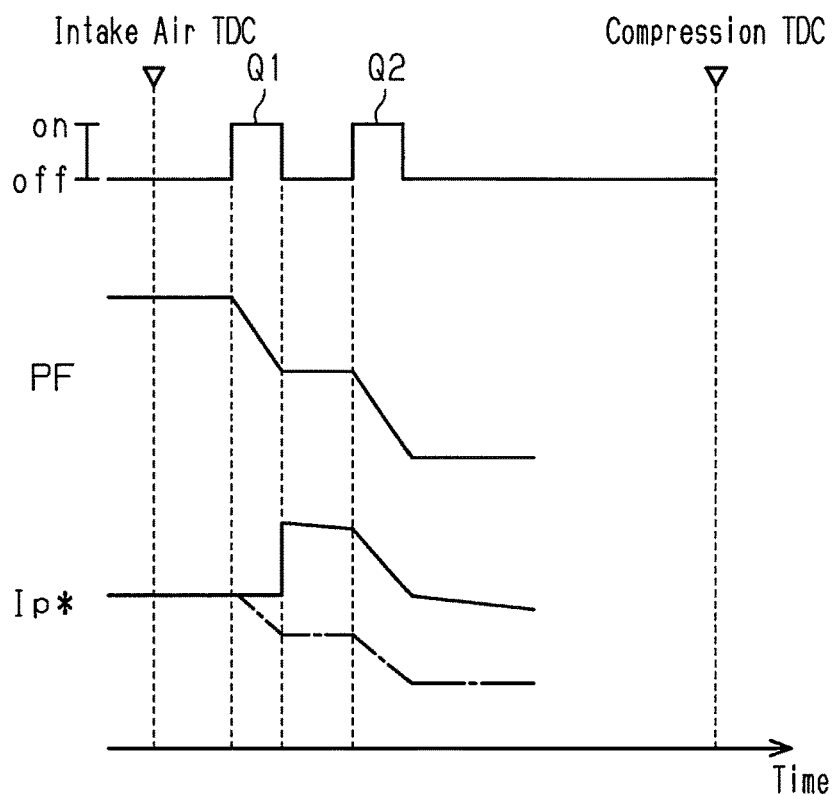
FIG. 9 is a timing chart showing changes in a peak current command value set by the controller of FIG. 1.

FIG. 9 shows the transitions of the first fuel injection Q1, the second fuel injection Q2, and the fuel pressure PF, and the transition of the peak current command value Ip* at the time of the catalyst rapid warming process. With respect to the fuel pressure PF, the transition of the fuel pressure that can be sensed by the fuel pressure sensor 102 is illustrated. The transition of the fuel pressure that can be recognized by the controller 70 from the sampling cycle and the like of the fuel pressure PF in the controller 70 is not illustrated. As shown in FIG. 9, the fuel pressure PF in the delivery pipe 60 is lowered by the first fuel injection Q1. FIG. 9 shows the transition of the peak current command value Ip* that can be set based on the fuel pressure PF shown in FIG. 9 with a chain dashed line. The peak current command value Ip* is a value that is not corrected using the increase correction amount ΔIp. The peak current command value Ip* set after the execution of the first fuel injection Q1 is smaller than the peak current command value Ip* for the first fuel injection Q1 due to the lowering of the fuel pressure PF.

In the present embodiment, on the other hand, the peak current command value Ip* set based on the fuel pressure PF and the like is increase-corrected using the increase correction amount ΔIp after the termination of the first fuel injection Q1. Thus, the peak current command value Ip* calculated after the termination of the first fuel injection Q1 is greater than the peak current command value Ip* calculated before. Thus, even if the pressure of the fuel near the nozzle needle 34, in particular, in the interior of the in-cylinder injection valve 30 becomes large by pulsation, the peak current command value Ip* sufficient for opening the injection hole 32 and injecting the fuel is calculated. As opposed to the present embodiment, when the lower limit guard value PLim is set to have a large margin, the peak current command value Ip* enabling the second fuel injection to be executed can be calculated without using the increase correction amount ΔIp. In this case, however, the peak current command value Ip* becomes an unnecessarily large value in the first fuel injection Q1, and thus the power consumption becomes large.

Figure 10:
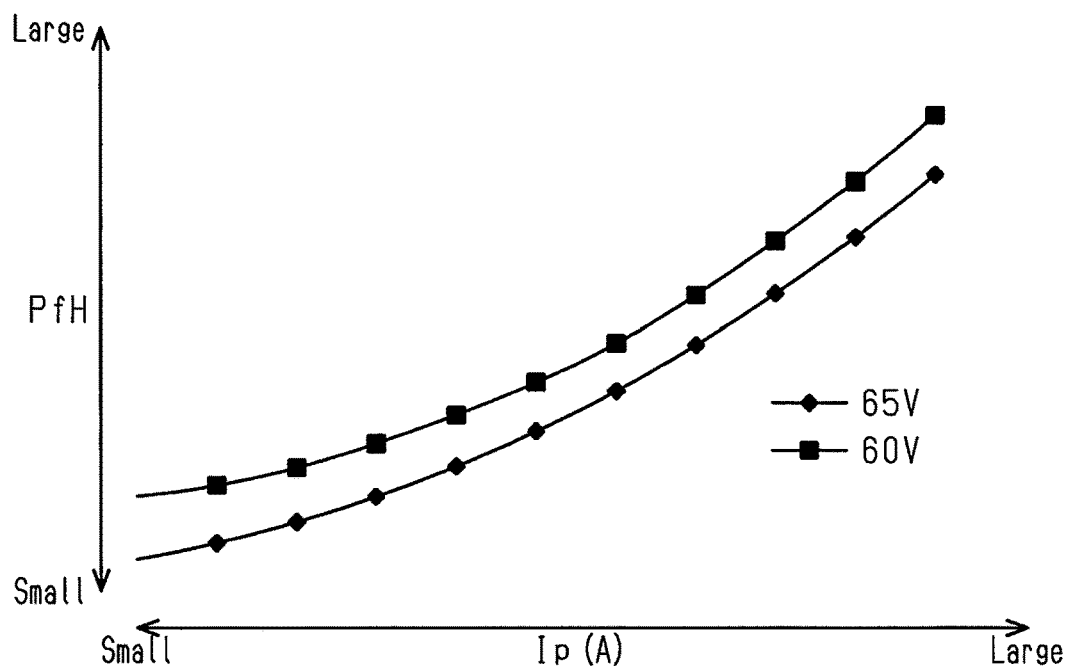
FIG. 10 is a view showing the relationship of a boosted voltage and a valve openable maximum pressure in the internal combustion engine of FIG. 1.
Figure 11:
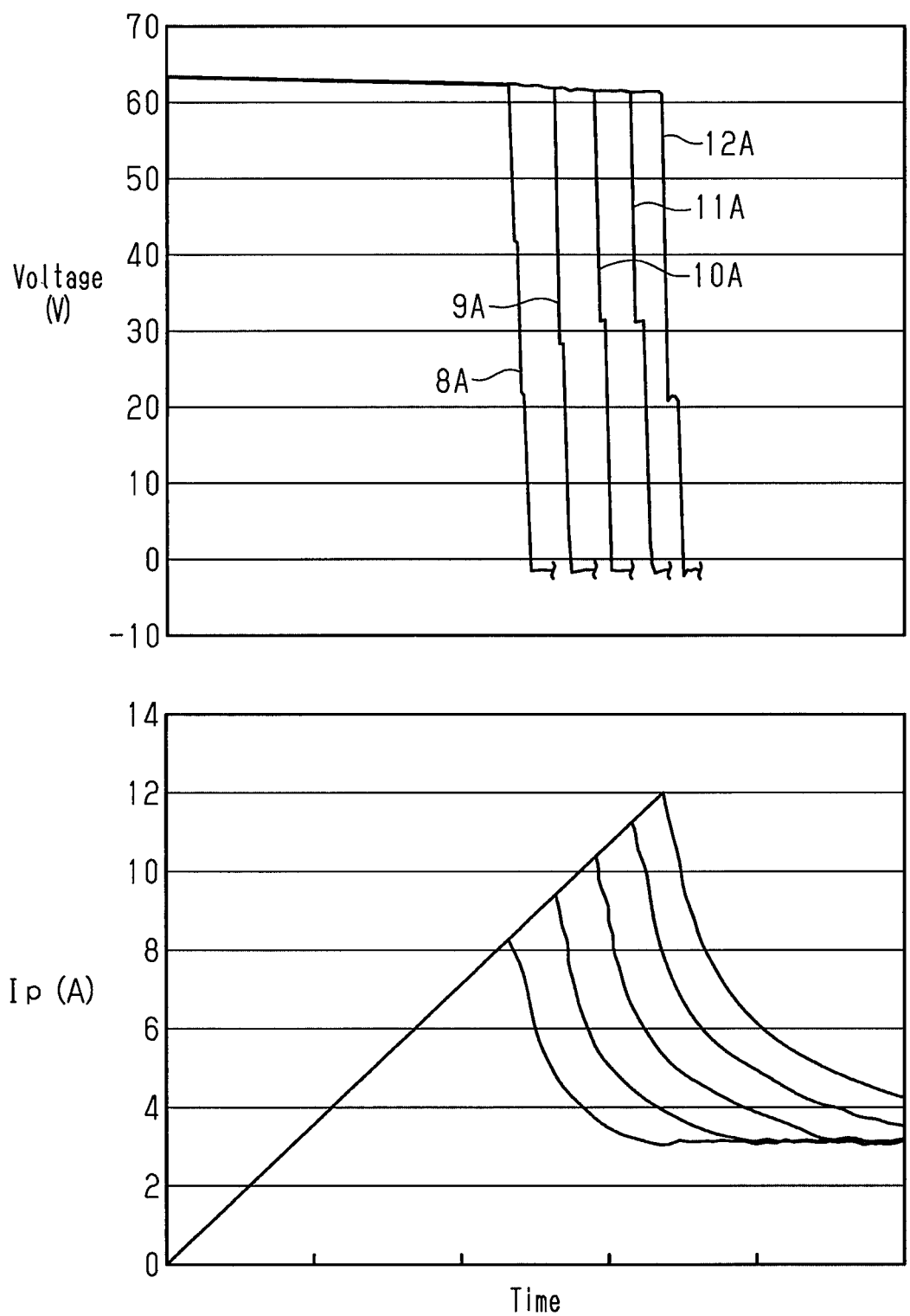
FIG. 11 is a timing chart showing the relationship of the boosted voltage and the peak current in the internal combustion engine of FIG. 1.

FIG. 10 shows a relationship of the peak current Ip and a maximum value PfH of the fuel pressure that can be injected when the boosted voltage of the booster circuit 72 is "65V" and a relationship of the peak current Ip and the maximum value PfH of the fuel pressure that can be injected when the boosted voltage is "60V" in comparison. The maximum value PfH of the fuel pressure that can be injected can be set to a large value considering the peak current Ip by setting the boosted voltage low. However, when lowering the boosted voltage, the time for the value of the current flowing through the solenoid coil 42 to reach the peak current command value Ip* is extended, and thus the power consumption becomes large. The graph on the lower side in FIG. 11 shows a current waveform flowing through the solenoid coil 42 when the boosted voltage is "65V" and the peak current command value Ip* is set to each of 8 to 12 A. The graph on the upper side in FIG. 11 shows a voltage on a side corresponding to the solenoid coil 42 of the switching element SW1 when the boosted voltage is "65V." As shown in the graph on the upper side of FIG. 11, the switching element SW1 is turned OFF in accordance with the value of the current flowing through the solenoid coil 42 reaching the peak current command value Ip*, and the voltage is lowered. When the boosted voltage is set to "60V," the time for the value of the current flowing through the solenoid coil 42 to reach the peak current command value Ip* becomes long compared to when the boosted voltage is set to "65V," and thus the consumed power becomes large. Thus, setting the boosted voltage low to give margin leads to increase in power consumption. Setting the boosted voltage low only at the time of the execution of the second fuel injection is difficult in terms of the configuration of the booster circuit 72. In other words, when configuring the booster circuit 72 as a circuit in which a charging voltage of an output capacitor is a boosted voltage, for example, the charges of the output capacitor need to be instantly removed.

The present embodiment described above further has the following operation effects.

(1) For example, when the catalyst rapid warming process is executed, the crank angle interval from the crank angle at which the first fuel injection Q1 is started to the crank angle at which the second fuel injection Q2 is started is small. When the crank angle interval is small, the fuel pressure PF referenced in the first fuel injection Q1 is used. Specifically, the peak current command value Ip* for the first fuel injection Q1 calculated by the process of S26 is used for the peak current command value Ip* for the second fuel injection Q2. Thus, even if it is difficult to newly acquire the fuel pressure PF for the setting of the peak current command value Ip* of the second fuel injection Q2, the peak current command value Ip* can be appropriately set.

(2) A so-called center injection method internal combustion engine 10 in which the in-cylinder injection valve 30 is arranged in a region sandwiched by the intake valve 18 and the exhaust valve 52 is adopted. In this case, an event in which the combustion tends to become unstable due to the third fuel injection Q3 being executed at a timing toward a retarding side from the timing at which the piston reaches the compression top dead point to enhance the warming performance of the catalyst rapid warming process can be compensated by the center injection method. In other words, the combustion is stabilized by the spray guide combustion of immediately leading the fuel spray injected from the in-cylinder injection valve 30 to the discharge spark of the ignition device 26.

When the internal combustion engine 10 of the center injection method is adopted, however, the length in the axial direction of the in-cylinder injection valve 30 tends to become long compared to when the in-cylinder injection valve 30 is arranged near the intake valve 18 and the like, and thus the shift between the pressure of the fuel near the nozzle needle 34 and the pressure of the fuel in the delivery pipe 60 tends to become large. Furthermore, the pulsation in the pressure of the fuel in the in-cylinder injection valve 30 tends to become large when the delivery pipe 60 and the in-cylinder injection valve 30 are connected with an elongate piping 62. Therefore, at the time of the execution of the retarding side fuel injection such as the second fuel injection Q2, the influence of the advancing side fuel injection such as the first fuel injection Q1 on the pulsation in the pressure of the fuel near the nozzle needle 34 is likely to be significant. The merit of using the increase correction amount ΔIp is thus particularly large.

(3) The internal combustion engine 10 equipped with the supercharger 13 is adopted. In this case, since the heat capacity of the supercharger 13 is large, the heat of the exhaust air is removed by the supercharger 13 and the three-way catalyst 56 is less likely to be warmed. Thus, in enhancing the warming performance of the rapid warming process, a request for setting the third fuel injection Q3 to the timing on the retarding side as much as possible is made, and thus the merit of adopting the center injection method is particularly large.

<Correspondence Relationship>

A correspondence relationship of the matter in the embodiment described above and the matter described in the section "SUMMARY OF THE INVENTION" is as follows. Hereinafter, the correspondence relationship is shown for every number in the aspect described in the section "SUMMARY OF THE INVENTION."

[1] and [6] The peak current command value calculating process corresponds to the processes of S10 to S32, the peak control process corresponds to the process of S34, the peak current command value for the first injection corresponds to the peak current command value Ip* when a negative determination is made in the process of S10, and the peak current command value for the second injection corresponds to the peak current command value Ip* when a positive determination is made in the process of S10.

[2] The peak current command value calculating process corresponds to the process of FIG. 9.

[3] The base process corresponds to the processes of S14 to S26, and the correction amount calculating process corresponds to the process of S30. The process in which the same detection value is used for the first injection and the second injection corresponds to the process of S27.

Other Embodiments

The present embodiment may be modified and implemented as described below. The present embodiment and the following variants can be implemented by being combined with each other within a scope not technically conflicting each other.

"Regarding Base Process"

In the embodiment described above, the processes of S14 to S26 are executed as the base process. Instead, the processes of S22 and S24 may be deleted. Furthermore, for example, the processes of S16 to S22 may be deleted and the base process may be assumed as the process of S24.

"Regarding Peak Current Command Value Calculating Process"

In the embodiment described above, the peak current command value Ip* calculated by the process of S26 is corrected using the increase correction amount ΔIp. Instead, for example, the map data in which the fuel pressure PF, the pump discharge amount DA, and the time interval are input variables and the peak current command value Ip* is the output variable may be stored in the ROM 94, and the peak current command value Ip* may be obtained by the CPU 92 through map calculation.

"Regarding Multi-Injection"

The injection pattern of the multi-injection is not limited to the injection pattern shown in FIG. 4. For example, a multistage injection using the in-cylinder injection valve 30 may not be executed in a region other than the region Ad4 for the rapid warming of the catalyst. Of course, it is not essential to execute the multi-stage injection using the in-cylinder injection valve 30 in the rapid warming process of the catalyst. For example, the multi-stage injection using the in-cylinder injection valve 30 may be executed only in the regions Ad2, Ad3. Furthermore, as will be described in the section "Regarding internal combustion engine," when the internal combustion engine 10 does not include the port injection valve 16, the multi-stage injection using both the port injection valve 16 and the in-cylinder injection valve 30 is not executed. Of course, even when the internal combustion engine 10 includes both the port injection valve 16 and the in-cylinder injection valve 30, for example, only the multi-stage injection using the in-cylinder injection valve 30 alone may be executed.

"Regarding In-Cylinder Injection Valve"

In the embodiment described above, the in-cylinder injection valve 30 is arranged in the region sandwiched by the intake valve 18 and the exhaust valve 52. Instead, for example, the in-cylinder injection valve 30 may be arranged near the intake passage 12 away from the region sandwiched by the intake valve 18 and the exhaust valve 52. In this case as well, when the peak current necessary for valve opening can become large by the influence of the pulsation in the pressure in the in-cylinder injection valve 30, it is effective to increase the peak current command value based on the time interval from the time of execution of the advancing side injection.

"Regarding Controller"

The controller is not limited to a device including the CPU 92 and the ROM 94 and executing the software process. For example, a dedicated hardware circuit (e.g., ASIC, etc.) for processing at least one part of the software process executed in the embodiment described above may be arranged. In other words, the controller merely needs to have any of the configurations of (a) to (c). (a) A processing device that executes all the processes described above according to the program, and a program storage device such as a ROM that stores the program are arranged. (b) A processing device that executes one part of the processes described above according to the program and a program storage device, and a dedicated hardware circuit that executes the remaining processes are arranged. (c) A dedicated hardware circuit that executes all the processes described above is arranged. The software circuit including the processing device and the program storage device, and the dedicated hardware circuit may be in plurals. In other words, the processes described above merely need to be executed by processing circuitry including at least one of one or more software circuits and one or more dedicated hardware circuits. The program storage device, that is, a computer readable medium includes all usable media that can be accessed with a general-purpose or dedicated computer.

"Regarding Internal Combustion Engine"

In the embodiment described above, the internal combustion engine 10 includes the port injection valve 16 and the in-cylinder injection valve 30. Instead, the internal combustion engine 10 may include only the in-cylinder injection valve 30. In addition, the supercharger 13 does not necessarily have to be used.

Therefore, the present examples and embodiments are to be considered as illustrative and not restrictive and the invention is not to be limited to the details given herein, but may be modified within the scope and equivalence of the appended claims.

The invention claimed is:

1. A controller for an internal combustion engine, wherein the internal combustion engine includes an in-cylinder injection valve configured to inject fuel supplied from a delivery pipe to a combustion chamber when opened by an electromagnetic force that acts on a movable element including a magnetic body and is generated by an energizing process of energizing a coil, the in-cylinder injection valve is further configured to execute multi-stage injection, the multi-stage injection includes execution of a plurality of fuel injections during a single combustion cycle in a cylinder, the plurality of fuel injections includes at least a first injection and a second injection carried out at a timing toward a retarding side from the first injection, and the timing at which the second injection is carried out is adjacent in time to a timing at which the first injection is carried out, the controller comprising:
  processing circuitry configured to execute
    a peak current command value calculating process of calculating a peak current command value, which is a command value of a peak current flowing through the coil because of the energizing process, based on a detection value of a pressure in the delivery pipe, and
    a peak control process of controlling a value of the peak current flowing to the coil at the peak current command value, and
    wherein the peak current command value calculating process includes, when the multi-stage injection is executed, a process of calculating a peak current command value for the first injection and a peak current command value for the second injection, the peak current command value for the second injection being greater than the peak current command value for the first injection.

2. The controller according to claim 1, wherein the in-cylinder injection valve is arranged in a region sandwiched by an intake valve and an exhaust valve.

3. The controller according to claim 1,
  wherein a catalyst is arranged in an exhaust passage of the internal combustion engine; and
  the peak current command value calculating process is executed when multi-stage injection is carried out from the in-cylinder injection valve in a rapid warming process of the catalyst after the internal combustion engine is started.

4. The controller according to claim 1, wherein the peak current command value calculating process includes a process of calculating the peak current command value for the second injection to be a larger value for a shorter time interval between the first injection and the second injection, and calculating the peak current command value for the second injection to be a smaller value for a longer time interval between the first injection and the second injection.

5. The controller according to claim 4, wherein the peak current command value calculating process includes:
  a base process of calculating a base peak current command value based on a detection value of the pressure;
  a correction amount calculating process of calculating an increase correction amount to be a larger value for a shorter interval between the first injection and the second injection, and calculating the increase correction amount to be a smaller value for a longer interval between the first injection and the second injection;
  a process of setting a value in which the base peak current command value is increase-corrected using the increase correction amount as the peak current command value for the second injection; and
  a process of setting the base peak current command value as the peak current command value for the first injection,
  wherein the base peak current command value for the first injection and the base peak current command value for the second injection are calculated based on the same detection value of the pressure.

6. A method for controlling an internal combustion engine, wherein the internal combustion engine includes an in-cylinder injection valve configured to inject fuel supplied from a delivery pipe to a combustion chamber when opened by an electromagnetic force that acts on a movable element including a magnetic body and is generated by an energizing process of energizing a coil, the in-cylinder injection valve is further configured to execute multi-stage injection, the multi-stage injection includes execution of a plurality of fuel injections during a single combustion cycle in a cylinder, the plurality of fuel injections includes at least a first injection and a second injection carried out at a timing toward a retarding side from the first injection, and the timing at which the second injection is carried out is adjacent in time to a timing at which the first injection is carried out, the method comprising:
  executing a peak current command value calculating process of calculating a peak current command value, which is a command value of a peak current flowing through the coil because of the energizing process, based on a detection value of a pressure in the delivery pipe, and
  executing a peak control process of controlling a value of the peak current flowing to the coil at the peak current command value, and
  wherein the peak current command value calculating process includes, when the multi-stage injection is executed, a process of calculating a peak current command value for the first injection and a peak current command value for the second injection, the peak current command value for the second injection being greater than the peak current command value for the first injection.

* * * * *